United States Patent [19]

Elle et al.

[11] Patent Number: 5,323,361

[45] Date of Patent: Jun. 21, 1994

[54] METHOD AND AN ARRANGEMENT FOR DISTANCE MEASUREMENT USING THE PULSE TRANSIT TIME PRINCIPLE

[75] Inventors: André Elle, Rümmingen; Hartmut Schmidt, Steinen, both of Fed. Rep. of Germany

[73] Assignee: Endress u. Hauser GmbH u. Co., Fed. Rep. of Germany

[21] Appl. No.: 69,290

[22] Filed: May 28, 1993

[30] Foreign Application Priority Data

Jun. 3, 1992 [DE] Fed. Rep. of Germany ....... 4218303

[51] Int. Cl.$^5$ ...................... G01S 13/08; G01F 23/00
[52] U.S. Cl. ...................................... 367/98; 367/908; 367/99
[58] Field of Search ..................... 367/98, 908; 342/91; 73/290 V

[56] References Cited

U.S. PATENT DOCUMENTS

| | | | |
|---|---|---|---|
| 4,000,650 | 1/1977 | Snyder | 73/290 V |
| 4,245,332 | 1/1981 | Schaefer | 367/98 |
| 4,596,144 | 6/1986 | Panton et al. | 73/290 V |
| 4,890,266 | 12/1989 | Woodward | 367/98 |
| 4,992,998 | 2/1991 | Woodward | 367/98 |

FOREIGN PATENT DOCUMENTS

WO90/08966 8/1990 PCT Int'l Appl. .

Primary Examiner—Daniel T. Pihulic
Attorney, Agent, or Firm—Barnes & Thornburg

[57] ABSTRACT

For the measurement of distance using the pulse transit time principle the received signal produced after each transmission of a pulse is stored as an echo profile and the effective echo is determined from the stored echo profile. In order to suppress recurrent interfering signals a stationary threshold profile adapted to the measurement environment is formed and employed for each evaluation of a stored echo profile. In order to take into account fluctuations in the properties of the received echo profile rapidly without necessitating a modification in the stationary threshold profile for this, from a stored echo profile a floating threshold profile is generated in the form of a monotonously descending curve. From the mutually corresponding values of the floating threshold profile and of the stationary threshold profile the respectively larger value is utilized for the formation of a resulting threshold profile, which is employed for each evaluation of stored echo profiles.

23 Claims, 5 Drawing Sheets

METHOD AND AN ARRANGEMENT FOR DISTANCE MEASUREMENT USING THE PULSE TRANSIT TIME PRINCIPLE

The invention relates to a method and an arrangement for distance measurement using the pulse transit time principle, in which in consecutive measurement cycles in each case in a transmission phase a pulse is transmitted and in a receiving phase following the transmission phase the received signal is stored as an echo profile, in which further from at least one stored echo profile the effective echo reflected at the object to be measured is ascertained and the distance of the object is ascertained from the interval in time between the transmission of the pulse and the reception of the effective echo, and in which a stationary threshold profile is formed, which is adapted to the measurement environment for suppression of recurrent interfering signals and is employed in each evaluation of stored echo profiles.

U.S. Pat. No. 4,890,266 describes a method of this type, which is particularly designed for measuring the level of filling of a container by means of ultrasonic pulses. In the case of such method the echo profile stored in the echo profile memory contains not only the effective echo but furthermore all other signals received in the course of the measurement cycle, which for instance originate from the post-pulse oscillation of the transmitter, from noise, echoes from other surfaces at which reflection takes place, multiple echoes etc. The stationary threshold profile (in U.S. Pat. No. 4,890,266 termed the "time varying threshold" or "TVT") is a profile corresponding to the echo profile, which has been adapted once and for all to the interference conditions in the measurement environment, for instance manually by the operator. The adaptation for example renders it possible to take into account echoes of constantly occurring interfering signals, as for example of echoes at fixed structures in the container. Therefore in order to determine the effective echo it is not all components of the stored echo profile which are subjected to evaluation but only those components which exceed the stationary threshold profile. This simplifies and speeds up the determination of the effective echo.

The advantage of the application of a stationary threshold exists however only as long as there is no substantial change in the conditions in the measurement environment. The entire echo profile may however be subject to substantial fluctuations owing to changes in absorption, propagation losses and the conditions of reflection, and furthermore owing to interfering noise etc. The stationary threshold profile does not take such changes in the conditions of measurement into account before it has been reset and adapted.

It is an object of the invention to provide a method and an arrangement of the type noted initially which render it possible to rapidly take into account fluctuations in the properties of the received echo profile without a modification of the stationary threshold profile being necessary therefor.

In order to attain this object the method in accordance with the invention comprises the steps that from a stored echo profile a floating threshold profile is generated by freeing the echo profile of fluctuations by smoothing it in such a manner that the result is a monotonously descending curve, that of the mutually corresponding values of the stationary threshold profile and of the floating threshold profile the respectively larger value is utilized for forming a resulting threshold profile and in that the resulting threshold profile is employed for each evaluation of stored echo profiles.

In the case of the method in accordance with the invention the threshold profile resulting from evaluation of the stored echo profile will correspond to the stationary threshold profile as long as the conditions of measurement continue to exist, for which the stationary threshold profile was produced. In the case of modifications in the conditions of measurement the resulting threshold profile will, in ranges in which the interfering components exceed the stationary threshold profile, consist of the corresponding sections of the floating threshold profile and in the other ranges of the corresponding sections of the stationary threshold profile. As a result even in the case of changed conditions of measurement substantial fractions of interfering components can be removed prior to evaluation. The monotonously descending character of the floating threshold profile ensures that the effective echo reliably exceeds the floating threshold profile and consequently also the resulting threshold profile.

The frequency of production of the floating threshold profile may be selected as desired in accordance with the changes to be expected in the conditions of measurement. Since the conditions of measurement as a rule only change very slowly, it is sufficient to generate the floating threshold profile fairly infrequently, for example once every day. In this respect it is significant that no adaptation by an operator is necessary for the generation of the floating threshold profile.

An arrangement for distance measurement using the pulse transit time principle comprising a transmitting and receiving device for transmitting a transmission pulse in each measurement cycle and for receiving the echo signals arriving as a result of each transmisssion pulse, and a signal processing circuit connected with the transmitting and receiving device, said signal processing circuit comprising an echo profile memory in which at least one echo profile is stored, which corresponds to the received signal supplied by the transmitting and receiving device in the course of a measurement cycle, an evaluation circuit, which from the echo profile stored in the echo profile memory ascertains the effective echo reflected at the object to be measured and determines the distance of the object from the time interval between the transmission of the pulse and the reception of the effective echo, and a stationary threshold profile circuit in which a stationary threshold profile adapted to the measurement environment is stored, which renders possible the suppression of recurrent interfering signals on each evaluation of a stored echo profile by the evaluation circuit, in accordance with the invention further comprises a floating threshold profile circuit with a device for generating and storing a smoothed and monotonously descending floating threshold profile from a stored echo profile and a combinatorial circuit for combining the floating threshold profile with the stationary threshold profile for forming and storing a resulting threshold profile, which is supplied to the evaluation circuit for the evaluation of the echo profile stored in the echo profile memory.

Advantageous developments and modifications of the method and the arrangement in accordance with the invention are defined in the dependent claims.

Further features and advantages of the invention will be understood from the following detailed descriptive disclosure of embodiments thereof in conjunction with the accompanying drawings, wherein FIG. 1 is a block diagram of an arrangement for the measurement of the level of filling in a container using ultrasonic pulses;

Figure 1:
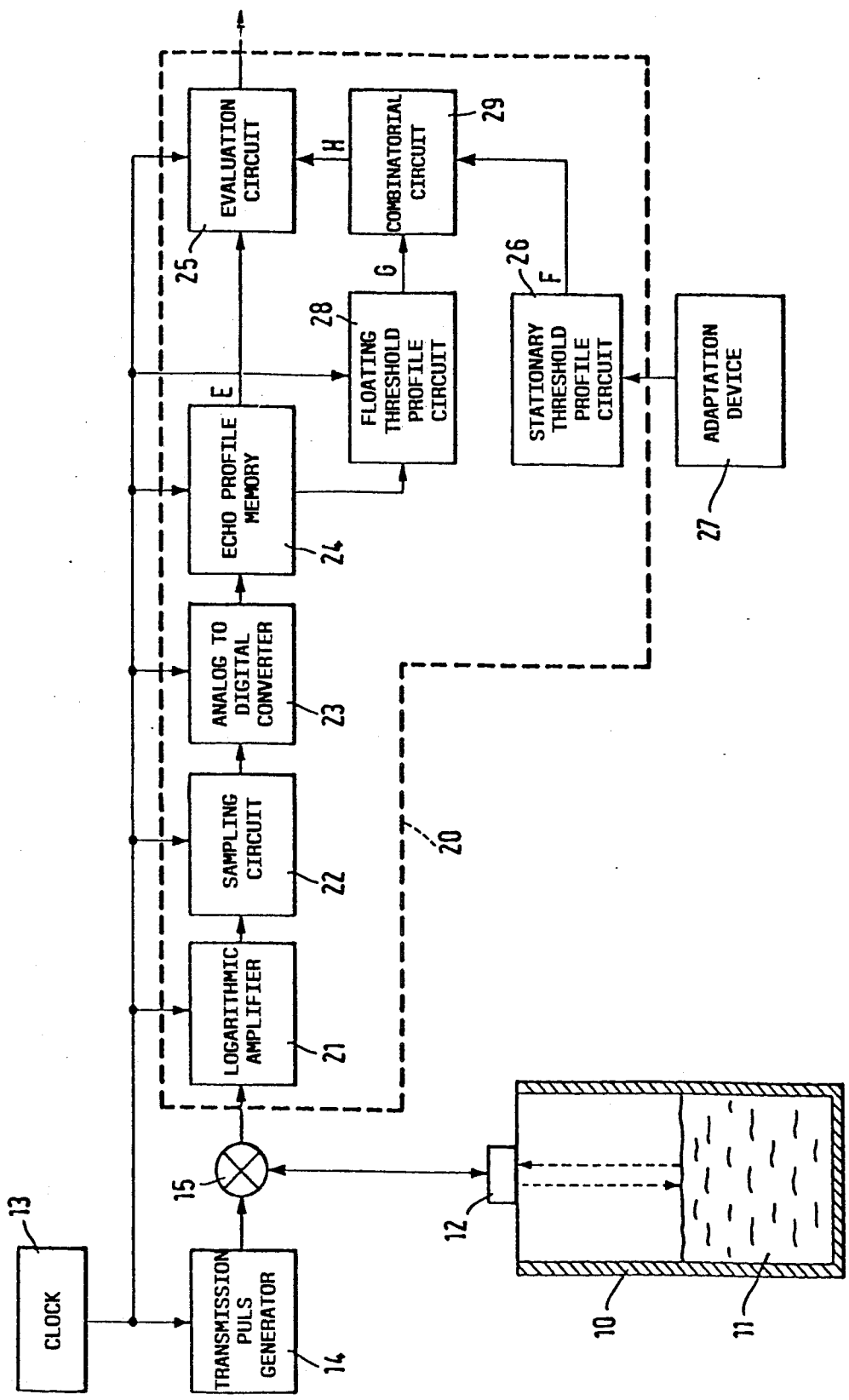

As an example for distance measurement in accordance with the pulse transit time method FIG. 1 shows an arrangement for the measurement of the level of filling of a container 10 which contains a material 11. At the top of the container 10 an ultrasonic transducer 12 is arranged above the highest possible filling level in order to function alternately as a transmitting transducer and as a receiving transducer. In the transmitting phase the ultrasonic transducer 12 is excited by an electrical signal so that it produces an ultrasonic pulse which is directed vertically downwards onto the material 11 in the container. During the receiving phase the ultrasonic transducer 12 receives the echo signal reflected at the surface of the material 11, which it converts into an electrical signal. One transmitting phase and one receiving phase constitute together one measurement cycle. A clock 13 times the measurement cycles and times, that is to say clocks the operations within each measurement cycle.

A transmission pulse generator 14 triggered at the start of each measurement cycle by the clock 13 is responsible for producing, during the transmitting phase, the pulse-like electrical signal, necessary for the operation of the ultrasonic transducer, at the frequency of the ultrasonic wave to be transmitted. This signal is supplied to the ultrasonic transducer 12 via a transmission-reception switch 15. All ultrasonic signals arriving at the ultrasonic transducer 12 after the cessation of the transmitted pulse are converted by the transducer 12 into an electrical received signal, which is supplied via the transmission-reception switch 15 to a signal processing circuit 20. Such received ultrasonic signals will more particularly include the effective echo pulse as well, which is reflected at the surface of the material 11 and whose transit time from the ultrasonic transducer 12 to the surface of the material and back again to the ultrasonic transducer 12 is to be measured. It is from this transit time that the distance of the surface of the material from the ultrasonic transducer 12 may be measured and accordingly also the level of filling of the container 10.

In addition to the effective echo pulses, the ultrasonic signals received by the ultrasonic transducer 12 include various interfering signals, more particularly interfering echo signals, which are reflected at other surfaces, for example on stationary fittings in the container, on material dropping down in the container, etc. An important purpose of the signal processing circuit 20 is to detect the effective echo pulse in the totality of the received ultrasonic signals so that it is impossible for a spurious ultrasonic signal to be interpreted as an effective echo signal and employed for the measurement of the transit time.

The signal processing circuit 20 comprises a logarithmic amplifier 21 which is supplied with the electrical received signal produced by the ultrasonic transducer 12 via the transmission-reception switch 15. The logarithmic amplifier 21 has its output connected with a sampling circuit 22 controlled by the clock 13, and which extracts a series of samples from the output signal of the logarithmic amplifier in the course of each receiving phase, which samples preferably have an equal spacing in time. Each sample has the amplitude of the logarithmically amplified received signal at the instant of sampling. An analog-to-digital converter 23 connected with the output of the sampling circuit converts every sample into a digital code group, which represents a number whose value corresponds to the amplitude of the sample. The resolution of the amplitude is dependent of the number of digits in the digital code group. If for example each sample is converted by the analog-to-digital converter 23 into a binary bit group with eight bits, it is possible for $2^8 = 256$ amplitude values to be distinguished. The time resolution is determined by the time intervals between the samples produced by the sampling circuit 22.

The digital code groups supplied in sequence during the course of each receiving phase by the analog-to-digital converter 23 are supplied to an echo profile memory 24 and are stored therein. The capacity of the echo profile memory 24 is at least so large that all digital code groups supplied during a measurement cycle can be stored. Such stored code groups represent the echo profile of the container 10 during the course of the overall measurement cycle. In many cases the capacity of the echo profile memory is substantially larger so that the echo profiles produced in a plurality of measurement cycles can be stored and evaluated in common.

An evaluation circuit 25 connected with the echo profile memory 24 has the purpose of detecting in the echo profile stored in the echo profile memory 24 the effective echo reflected at the surface of the material, determining the transit time of the effective echo and calculating from this the degree of filling of the container. The evaluation circuit provides a signal at the output which represents the degree of filling of the container.

Figure 2:
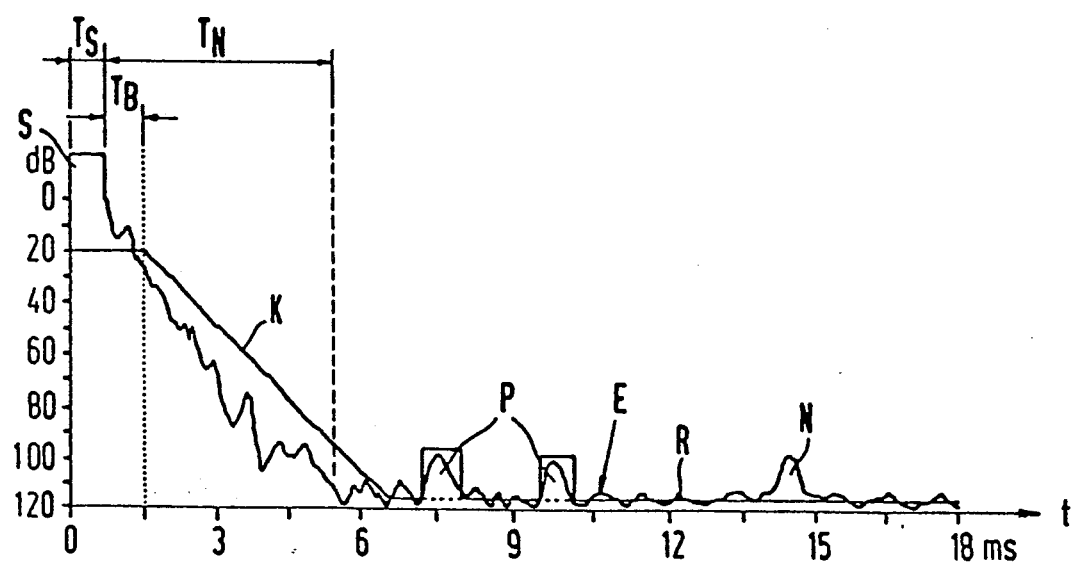
FIGS. 2 and 3 are graphs of the echo profiles produced in the arrangement of FIG. 1 in connection with a stationary threshold profile in accordance with the prior art.

FIG. 2 shows an example for an echo profile E stored in the echo profile memory 24. It represents the changes in amplitude of the received signals sampled during a measurement cycle, and then digitized against time t. At the point in time $t = 0$ the excitation of the ultrasonic transducer 12 by the transmission pulse S produced by the transmission pulse generator 14 is started, which transmission pulse has the duration $T_S$ and passes with a great amplitude to the input of the logarithmic amplifier 21. After the end of the transmission pulse S the ultrasonic transducer 12 continues to oscillate a certain time $T_N$; during this time the echo profile descends exponentially from the high transmitting level to the low receiving level. In order to prevent saturation of the amplifier 21 by the transmission pulse S, the amplifier 21 is locked for the duration $T_S$ of the transmission pulse S and for a time $T_B$ following the end of the transmission pulse until the received level has fallen to a predetermined value, which in the case of the example of FIG. 2 amounts to 20 dB. During this time $T_B$ no evaluation of the received signals and therefore no measurement of distance is possible; the minimum distance corresponding to the blocking of the amplifier 21, as from which distance measurement becomes possible at all, is consequently termed the "blocking distance". The blocking distance time $T_B$ may be equal to the overall post-pulse oscillation $T_N$, or, as shown in FIG. 2, also be shorter than it.

In the receiving phase following the end of the post-pulse oscillation $T_N$ the echo profile represents the noise R, on which interference echoes P are superimposed which originate from other reflecting surfaces than the surface of the material, as for instance from fixed fittings in the container. Finally, the echo profile comprises the effective echo N which is reflected by the surface of the material and which can usually be recognized by the fact that with a predetermined minimum duration it has a greater amplitude than the other components of the echo profile. Strong interfering pulses, whose amplitudes are of the same order as those of the effective echo, may generally be distinguished from the effective echo owing to the substantially shorter pulse duration.

In order to prevent the evaluation circuit 25 erroneously interpreting one of the interfering echoes P from a fixed fitting as an effective echo, it is known in the art to record a stationary threshold profile corresponding to the echo profile, which is adapted once and for all to the interference conditions in the container 10. FIG. 2 shows as an example such a stationary threshold profile K of known type. In order to form the stationary threshold profile K it is generally conventional to produce a smoothed curve corresponding to the average form of the echo profile and so offset in relation to the echo profile upwards that it is not exceeded by the components due to post-pulse oscillation and by the noise signal components normally present in the echo profile. This curve is additionally changed in selected parts in order to also suppress constantly recurring known interfering echoes P which would exceed the average threshold profile. This adaptation may for instance be performed manually by the operator.

In accordance with the prior art the stationary threshold profile K is supplied to the evaluation circuit 25 for each evaluation of an echo profile. The evaluation circuit 25 then only examines those stored digital code groups of the echo profile, whose amplitude values are larger than the amplitude values of the digital code groups, associated with the same points in time, of the stationary threshold profile. Therefore all components of the echo profile E, which in the graph of FIG. 2 do not exceed the stationary threshold profile K, are left out of the evaluation. This ensures that not one of the interfering echoes P is incorrectly interpreted as an effective echo.

Figure 3:
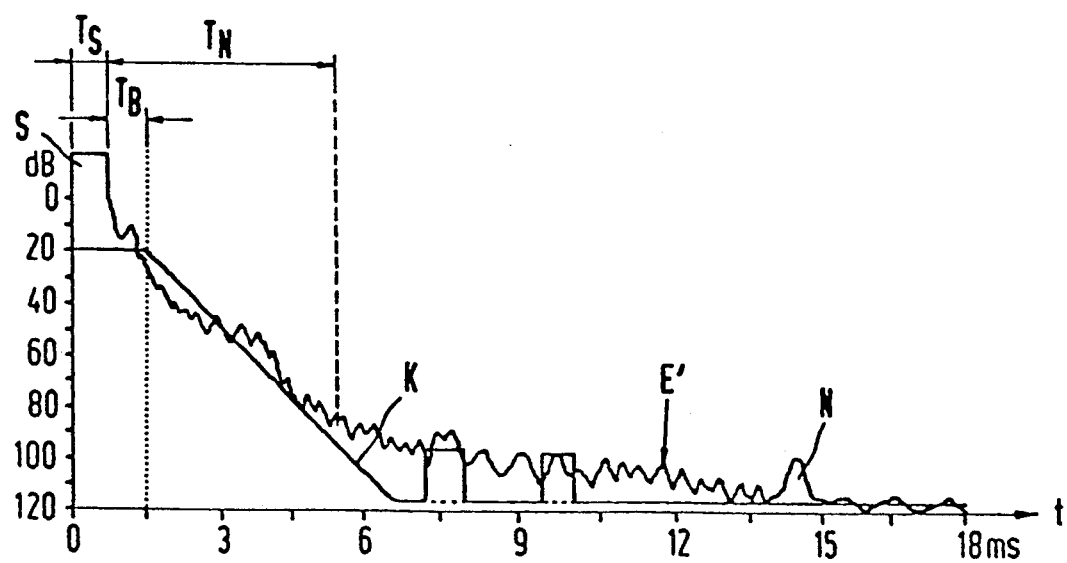

The method so far described operates satisfactorily as long as the acoustic conditions in the container 10 are not substantially changed. The entire echo profile may however be subject to substantial fluctuations owing to changes in absorption, propagation losses, changes in the condition of reflection, interfering noise etc. The conventional stationary threshold profile K does not take into account such changes in the conditions of measurement before it has been re-established and has been adapted. FIG. 3 again shows as an example the stationary threshold profile K of FIG. 2 and furthermore the echo profile E' with the same effective echo N as in FIG. 2, which has, however, a heavy interfering noise impressed on it. The consequence of this interfering noise is that practically all stored samples of the echo profile E' exceed the stationary threshold profile K and therefore are evaluated in the evaluation circuit 25 for recognition of the effective signal N. This increases the danger of such a spurious pulse peak of the echo profile being regarded as the effective signal in error.

For automatic adaptation to suit such changes in the echo profile, in the signal processing circuit 20 of FIG. 1 the threshold profile supplied to the evaluation circuit 25 is formed by combining a stationary threshold profile F with a floating threshold profile G. The stationary threshold profile F is stored in the form of digital code groups in a stationary threshold profile circuit 26 in the same manner as the echo profile E is stored in the echo profile memory 24. It does however differ from the conventional stationary threshold profile K of FIGS. 2 and 3 since it is only designed for the suppression of the constantly recurring interference echoes P. The necessary adaptation to suit the respectively applying interference conditions in the container may be performed using an adaptation device 27, for instance manually by the operator. Furthermore the signal processing circuit 20 of FIG. 1 additionally comprises a floating threshold profile circuit 28, which produces a floating threshold profile G from the echo profiles stored in the echo profile memory 24, such floating threshold profile G being combined in a combinatorial circuit 29 with the stationary threshold profile F supplied by the circuit 26. In order to form the floating threshold profile G the echo profile E is freed of fluctuations by means of a smoothing filter. The smoothing is so performed that its result is a monotonously descending curve, which is also stored in the form of digital code groups in the floating threshold profile circuit 28. The combining is performed in such a manner that the amplitude values, corresponding to the same points in time, of the stationary threshold profile F and of the floating threshold profile G are compared with one another; the larger of the two values is stored in the combinatorial circuit 29. The totality of the digital code groups stored in this manner in the combinatorial circuit 29 amounts to a resulting threshold profile H, which is supplied to the evaluation circuit 25.

Figure 4:
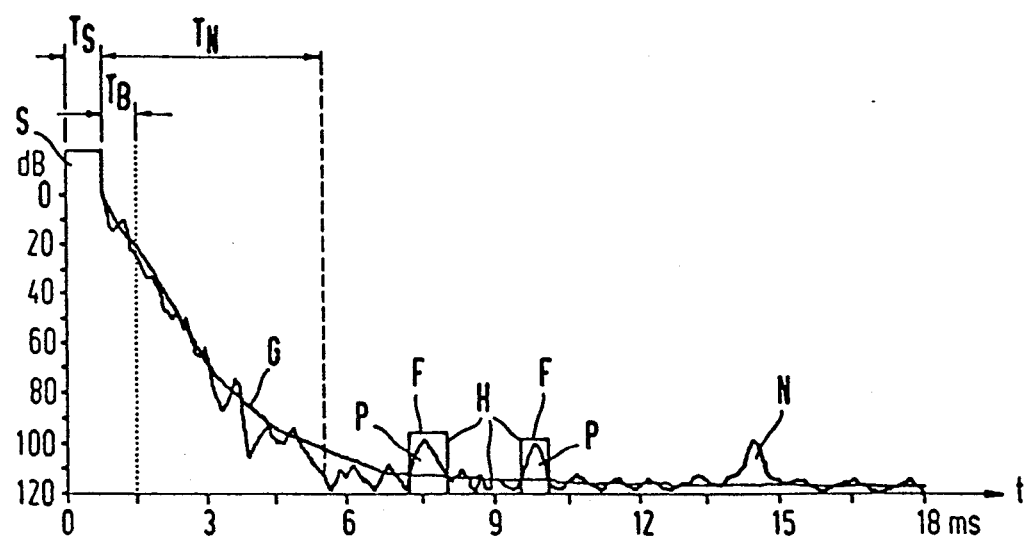
FIGS. 4 and 5 are graphs of the echo profiles represented in FIG. 2 and FIG. 3, respectively, in connection with the threshold profiles utilized in accordance with the invention.
Figure 5:
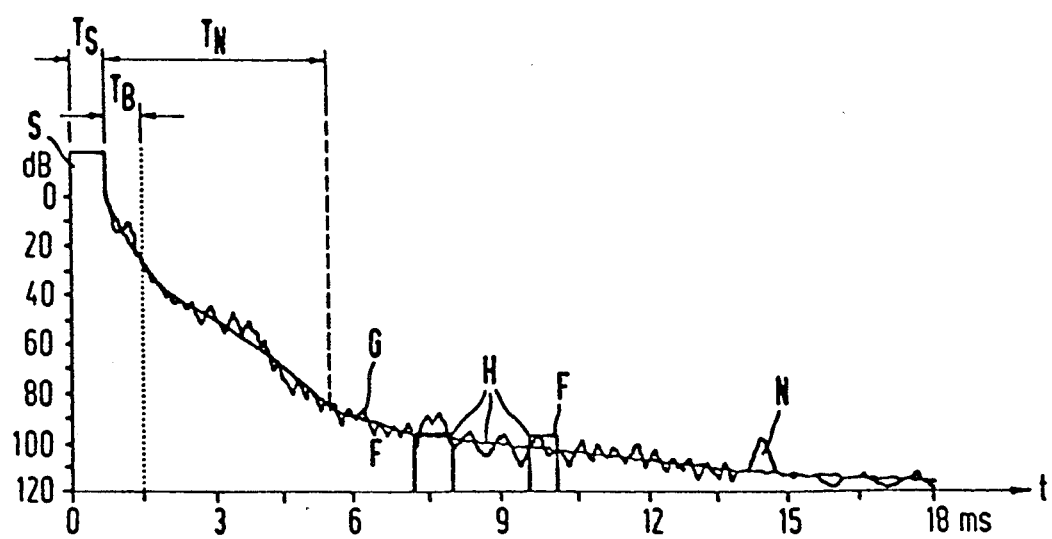

The result of these measures is illustrated in FIGS. 4 and 5. FIG. 4 again shows the echo profile E of FIG. 2 and furthermore the stationary threshold profile F stored in the stationary threshold profile circuit 26, the floating threshold profile G stored in the floating threshold profile circuit 28 and the resulting threshold profile H obtained by combining of the threshold profiles F and G in the combinatorial circuit 29, which latter profile H is supplied to the evaluation circuit 25. The stationary threshold profile F consists only of the square peaks at the positions of the recurrent interfering echoes P. The floating threshold profile G follows the waveform of the echo profile in the form of a monotonously descending curve, which extends generally in the middle between the maximum and the minimum interfering peaks. At the positions of the interfering echoes P the resulting threshold profile H corresponds to the stationary threshold profile F and in other respects to the floating threshold profile G. Owing to the monotonously descending form, the floating threshold profile G does not rise again at the positions of the interfering echoes P and of the effective echo N so that these echoes distinctly stand out from the floating threshold profile G. Since however the interfering echoes P are suppressed in any case by the stationary threshold profile F, only the effective echo N is detected and evaluated. The evaluation circuit 25 is, of course, so designed that it ignores the interfering and noise peaks exceeding the resulting threshold profile H; the reference line used for the evaluation of the amplitude of the echo profile E is not the base line (t axis) but rather the resulting threshold profile H, and the evaluation circuit detects as the effective echo only that echo that most exceeds this reference line FIG. 5 shows in a similar manner the threshold profiles F, G and H for the case of the echo profile E' of FIG. 3. The stationary threshold profile F has the same waveform as in FIG. 4. The floating threshold profile G follows the waveform of the changed echo profile E' and consequently differs substantially from the floating threshold profile of FIG. 3. Owing to the monotonously descending waveform of the floating threshold profile G the effective echo H in this case as well distinctly stands out from the resulting threshold profile H.

Figure 6:
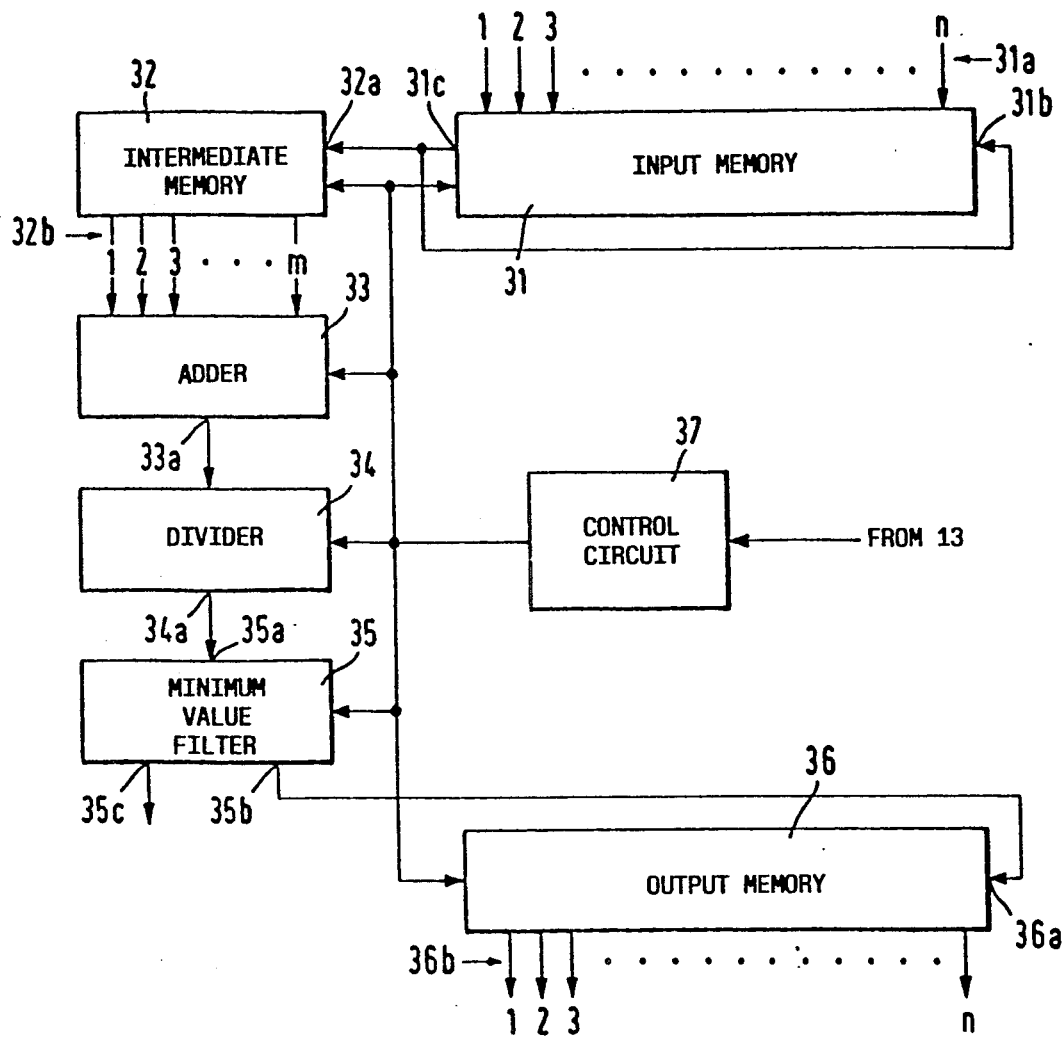
FIG. 6 shows a first embodiment of the floating threshold profile circuit employed in the arrangement of FIG. 1.

FIG. 6 shows an embodiment of the floating threshold profile circuit 28, which produces a floating threshold profile G of the type mentioned above from the echo profile E stored in the echo profile memory 24. As an example it is assumed that each echo profile stored in the echo profile memory 24 is represented by n binary code groups of k bits each, which have been formed by digitizing n samples of the received signal. Each of these code groups constitutes a numerical value which expresses the amplitude of the echo profile at a certain point in time in the measurement cycle.

The floating threshold profile circuit of FIG. 6 comprises an input memory 31 with n memory positions of k bits each and hence sufficient in capacity for storing a complete echo profile. The input memory 31 has a group of n parallel inputs 31a, a serial input 31b and a serial output 31c. The parallel inputs 31a are connected with corresponding parallel outputs of the echo profile memory 24 for the transmission of the n code groups of a stored echo profile. The serial input 31b is connected with the serial output 31c so that the n code groups stored in the input memory 31 may be kept circulating. Preferably the input memory 31 is designed in the form of a shift register with n register stages, each register stage being able to accept one binary code group of k bits and constituting one memory position of the input memory.

The serial input 32a of an intermediate memory 32 is connected with the output 31c of the input memory 31, such intermediate memory 32 having m memory positions of k bits each with m<n. The intermediate memory 32 is preferably designed in the form of a shift register with m register stages, each register stage being able to accept a binary code group of k bits and constituting one memory position of the intermediate memory. The code groups stored in the m memory positions are available at m parallel outputs 32b. The m parallel outputs 32b of the intermediate memory 32 are connected with the m parallel inputs of an adder 33, which at its output 33a supplies a digital signal which represents the sum of the numerical values which are expressed by the code groups supplied to its inputs. This digital signal is supplied to a divider 34, which divides the sum supplied by the adder 33 by the number of code groups of which the sum is made up, and the result of division is supplied in the form of a binary code group of k bits at the output 34a. Therefore the code group supplied at the output 34a represents the arithmetic mean value of the code groups stored in the intermediate memory 32.

The output 34a of the divider 34 is connected with the input 35a of a minimum value filter 35, whose manner of operation will be explained later with reference to the embodiment depicted in FIG. 7. The digital code groups appearing at the output 35b of the minimum value filter are supplied to the serial input 36a of an output memory 36 which has n memory positions for respectively k bits and hence has the same storage capacity as the input memory 31. The digital code groups stored in the n memory positions of the output memory 36 are available at n parallel outputs 36b. The outputs 36b correspond to the output of the floating threshold profile circuit 28 of FIG. 1 and are connected with the combinatorial circuit 29. Preferably the output memory 36 is constituted by a shift register like the input memory 31.

Finally the floating threshold profile circuit of FIG. 6 comprises a control circuit 37 which supplies the necessary clock, reset and control signals to the already mentioned circuit units 31 through 36 and for its part receives control and clock signals from the clock 13.

Figure 7:
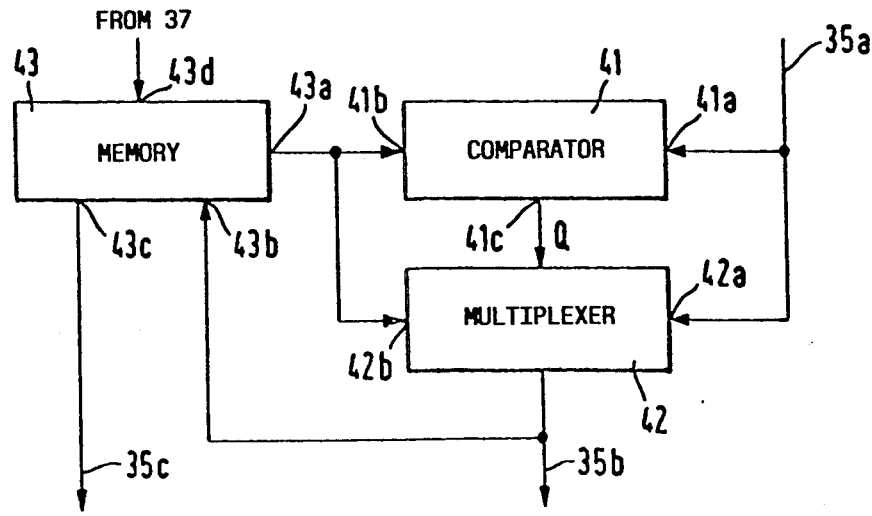
FIG. 7 shows an embodiment of the minimum value filter employed in the floating threshold profile circuit of FIG. 5.

The embodiment depicted in FIG. 7 of the minimum value filter 35 comprises a comparator 41, a multiplexer 42 controlled by the comparator 41 and a memory 43 for one binary code group.

The input 35a receiving the output signals of the divider 34 is connected with a first input 41a of the comparator 41 and with a first input 42a of the multiplexer 42. One output 43a of the memory 43 is connected with a second input 41b of the comparator 41 and with a second input 42b of the multiplexer 42. The output 41c of the comparator 41 is connected with a control input of the multiplexer 42. The output of the multiplexer 42 constitutes the output 35b of the minimum value filter 35 and is moreover connected with an input 43b of the memory 43. The memory 43 has a second output 43c, which corresponds to the output 35c of the minimum value filter 35, but is not used in the circuit of FIG. 6.

At the start of each working cycle in the course of which a floating threshold profile G is generated, the code group with the maximum possible numerical value is set in the memory 43 by a reset signal which is supplied by the control circuit 37 via a control input 43d. In the course of the measurement cycle, the code groups arriving from the divider 34 are sequentially supplied to the input 41a of the comparator 41 and to the input 42a of the multiplexer 42, and simultaneously with the reception of each such code group the code group stored in the memory 43 is applied to the input 41b of the comparator 41 and to the input 42b of the multiplexer 42. The comparator 41 compares the code groups present at its inputs 41a and 41b and delivers at its output 41c a signal Q wich has the value of 1 if the code group present at the input 41b has a greater numerical value than the code group present at the input 41a, and has the value of 0 if the code group present at the input 41b has a smaller numerical value than the code group present at the input 41a, or if both code groups have the same numerical value. If the signal Q supplied to the control input of the multiplexer 42 has the value 1, the multiplexer will transfer the code group supplied to the input 42a to the output 35b, and if the signal Q has the value 0, the multiplexer 42 will transfer the code group present at the input 42b to the output 35b. Thus of the two code groups present at its inputs 42a and 42b the multiplexer 32 transfers that respective one which has the smaller numerical value to the output 35b. In each case the code group appearing at the output 35b is then stored in the memory 43 as the new content thereof.

The above mentioned manner of operation of the minimum value filter leads to the effect that the memory 43 constantly stores the code group with the smallest numerical value which has occurred up till the point in time in question in the course of the working cycle. The stored code group appears at the output 35b as long as the code groups from the divider 34 have larger numerical values than the stored code group. If on the other hand a code group coming from the divider 34 has a smaller numerical value than the stored code group, it is transferred to the output 35b instead of the stored code group and the code group stored in the memory 43 is then replaced by the new code group with the smaller numerical value.

At the second output 43c of the minimum value filter 35 the code group stored in the memory 43 will appear simultaneously with the code group supplied at the output 35b, before the code group delivered at the output 35b is stored in the memory 43 as the new content. Thus the last and the penultimate groups of the code groups supplied by the multiplexer 42 are simultaneously present at the outputs 35b and 35c.

In what follows the formation of a floating threshold profile in the course of a working cycle in the above mentioned circuits of FIGS. 6 and 7 will be described. At the start of the working cycle the n code groups of an echo profile stored in the profile memory 24 are supplied in parallel via the inputs 31a to the input memory 31 of the floating threshold profile circuit 28. These code groups are shifted by the clock signals, which are supplied by the control circuit 37, in the input memory 31, which is in the form of a shift register so that they will appear sequentially at the output 31c and are input again via the input 31b to the input memory 31. Simultaneously every code group appearing at the output 31c is fed to the intermediate memory 32 and shifted therein under the control of the clock signals supplied by the control circuit 37 in step with the code groups stored in the input memory 31. Thus the intermediate memory 32 begins to fill with the code groups arriving from the input memory 31 until after input of the first m code groups it is completely full. On input of further code groups the m last supplied code groups remain in the intermediate memory 32, whereas the code groups which were stored earlier therein disappear. The order in time of the input of the code groups in the intermediate memory 32 corresponds to the order in time of the formation of the code groups of the echo profile in the course of a measurement cycle: Firstly the code group number 1 is input, which has been formed as the first one at the start of a measurement cycle by sampling the received signal and digitizing the sample, then the code group number 2 etc. until finally the last code group number n has been input, which was formed at the end of the measurement cycle.

After each input of a code group into the intermediate memory 32, the adder 33 forms the sum of the numerical values of all code groups present in the intermediate memory 32 and at the output 33a supplies a code group representative of this sum to the divider 34. The divider 34 divides the numerical value of each code group arriving from the adder 33 by the number of the code groups present in the intermediate memory 32 and at the output supplies a code group, which represents the numerical value of the division result, that is to say the arithmetic mean value of the numerical values of the code groups present in the intermediate memory 32. As described in the above, the minimum value filter 35 supplies, for each code group arriving from the divider 34, at the output 35b a code group whose numerical value corresponds to the minimum mean value that has occurred so far in the same working cycle. These minimum value code groups appear at the output 35b of the minimum value filter 35 in step with the transfer of the code groups from the input memory 31 to the intermediate memory 32. The minimum value code groups are input and shifted in step with this in the output memory 36.

After the n code groups of the echo profile present in the input memory 31 have been transferred to the intermediate memory, there are therefore n code groups in the output memory 36, which have continuously decreasing or, at the most, equal numerical values. These code groups constitute the floating threshold profile G, which accordingly has a monotonously descending waveform.

The n code groups of the floating threshold profile G present in the output memory 36 are input in parallel via the outputs 36b to the combinatorial circuit 29 (see FIG. 1) and combined with the code groups of the stationary threshold profile F stored in the stationary threshold profile circuit 26. The combining is simply performed by comparing each code group of the floating threshold profile G with the corresponding code group of the stationary threshold profile F and selecting and storing the code group with the larger numerical value. The code groups selected and stored in this manner constitute together the resulting threshold profile H, which is supplied to the evaluation circuit 25.

Figure 8:
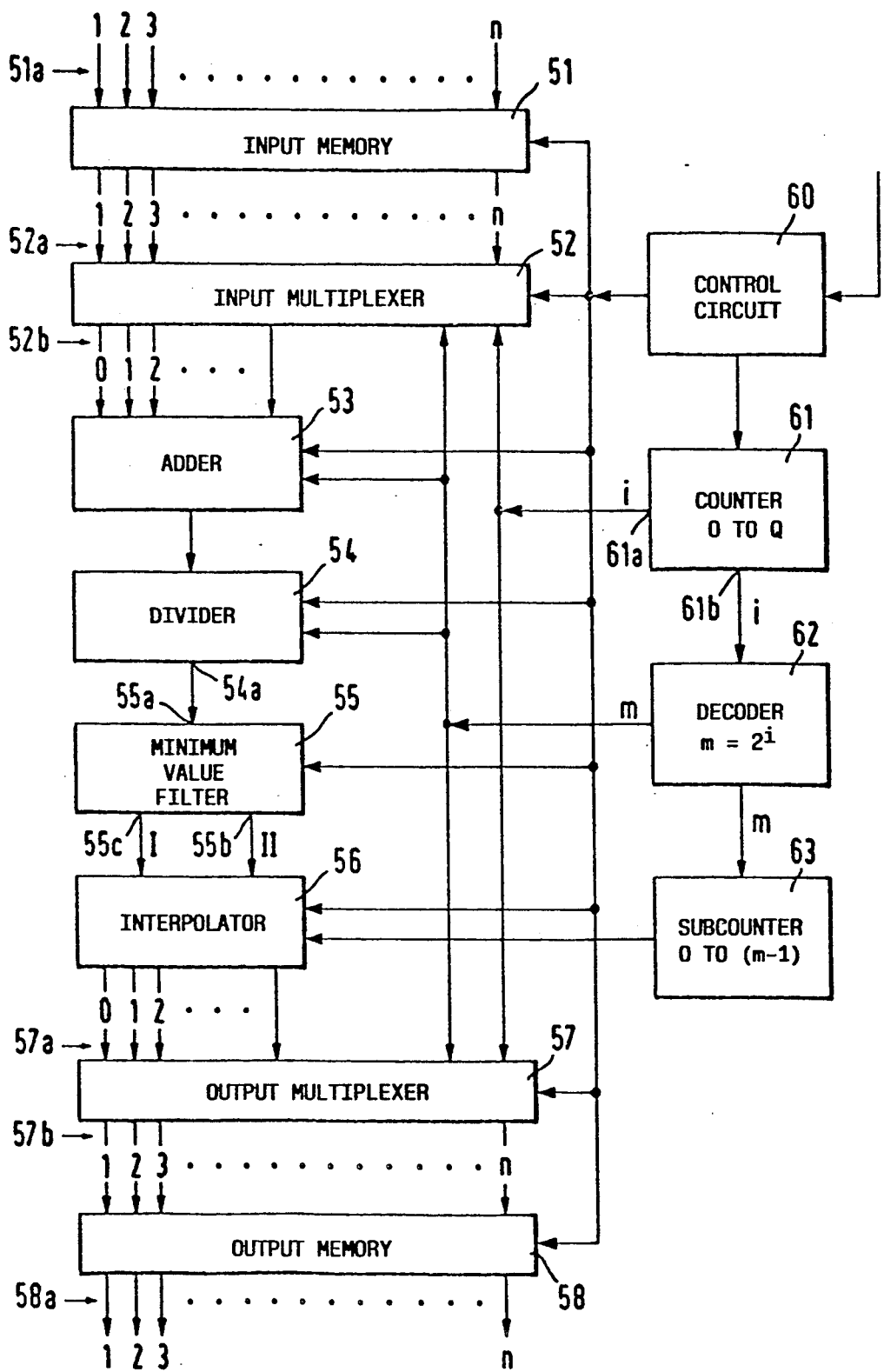
FIG. 8 shows a second embodiment of the floating threshold profile circuit utilized in the arrangement of FIG. 1.

FIG. 8 shows another embodiment of a floating threshold profile circuit, which may be employed for the floating threshold profile circuit 28 of FIG. 1. The floating threshold profile circuit of FIG. 8 has an input memory 51 with n memory positions of k bits each, whose memory capacity is hence sufficient for the storage of a complete echo profile. The input memory 51 has a group of n parallel inputs 51a and a group of n parallel outputs. The n parallel inputs 51a are connected with the echo profile memory 24 for the transfer of the n code groups of a stored echo profile. The n parallel outputs of the input memory 51 are connected with n parallel inputs 52a of an input multiplexer 52. With the parallel outputs 52b of the multiplexer 52 an adder 53 is connected, which like the adder 33 of FIG. 6 forms the sum of the numerical values of m code groups which the multiplexer 52 selects from the n code groups which are supplied to its inputs. The digital output signal from the adder 53 representing the sum is supplied to a divider 54, which—like the divider 34 in FIG. 6—divides the sum by the number of code groups, from which the sum has been formed and supplies the result of division in the form of a digital code group at the output 54a. Thus the code group supplied at the output 54a represents the arithmetic mean value of the numerical values added by the adder 53.

The output 54a of the divider 54 is connected with the input 55a of a minimum value filter 55, which has the same mode of operation as the minimum value filter 35 of FIG. 6 and for example may have the structure depicted in FIG. 7. The two outputs 55b and 55c of the minimum value filter 55 correspond to the outputs 35b and 35c, respectively, of the minimum value filter of FIG. 7. The minimum value filter 55 of FIG. 8 therefore simultaneously delivers the last and the penultimate filtered code group with the so far lowest numerical values at the two outputs 55b and 55c. The penultimate code group supplied at the output 55c will be termed the code group I and the last code group supplied at the output 55b will be termed code group II.

The outputs 55c and 55b of the minimum value filter 55 are connected with two inputs of an interpolator 56, which performs a linear interpolation in (m-1) steps between the numerical values of the code groups I and II and supplies (m-1) code groups which correspond to the interpolation values, and furthermore the code group II at its outputs. The outputs of the interpolator 56 are connected with a corresponding number of inputs 57a of an output multiplexer 57, which has n outputs 57b which are connected with the n inputs of an output memory 58. The output memory 58 has n memory positions, each with k bits, and thus has the same capacity as the input memory 51. The code groups stored in the n memory positions of the output memory 58 are available at n parallel outputs 58a, which correspond to the output of the floating threshold profile circuit 28 of FIG. 1. The output memory 58 has, in the circuit of FIG. 8, the same function as the output memory 36 in the circuit depicted in FIG. 6; at the end of a working cycle the values of a complete floating threshold profile G are present in the output memory 58.

Furthermore the floating threshold profile circuit of FIG. 8 comprises a control circuit 60, which supplies the required clock, reset and control signals for the above mentioned circuit units 51 through 58 and hence has essentially the same function as the control circuit 37 in the floating threshold profile circuit of FIG. 6. The control circuit 60 additionally supplies count pulses to a counter 61, whose count i is available at outputs 61a and 61b. A decoder 62 connected with the output 62b forms from the count i the number m which is supplied to the input multiplexer 52, to the adder 53, to the divider 54, to the output multiplexer 57 and furthermore to a subcounter 63. The functions of these circuits will be clear from the following description of the performance of one working cycle.

The essential difference between this system and the floating threshold profile circuit of FIG. 6 is that in the floating threshold profile circuit of FIG. 8 it is not every value of the floating threshold profile present in the output memory 58 which is directly determined from values of the echo profile present in the input memory 51; in fact there are q+1 support points, which are the border values of ranges 0..i..q, the intermediate values being obtained in each of such ranges by linear interpolation. The consecutively processed ranges are determined by the counter 61, which counts in each working cycle from 0 to q. For each range, m values of the floating threshold profile are formed; for this purpose it is necessary for m-1 intermediate values to be derived by interpolation in addition to the two border values which correspond to the support points. The ranges have a increasing size from range 0 to range q and accordingly the distances between the support points and the number m of the values to be formed for each range increase. The increase is determined by the decoder 62 and can be selected just as desired. In the following example to be described it is assumed that the decoder forms the number m from the count i in accordance with the function $$m = 2^i.$$

This means that each range is larger by a factor 2 than the preceding range.

At the start of each working cycle the n code groups of a complete echo profile are supplied to the input memory 51. The counters 61 and 63 are reset to zero. As previously explained with reference to FIG. 7, the code group with the maximum possible numerical value is set in the memory 43 of the minimum value filter 55.

The input multiplexer 52 is controlled by the signal, coming from the decoder 62 with the numerical value m in such a manner that it delivers the code groups which are supplied to the inputs numbers m through (2m-1) of its input group 52a, at the outputs numbers 0 through (m-1) of its output group 52b. Therefore, for each range whose number is determined by the count of the counter 61, m values of the echo profile present in the input memory 51 are selected by the input multiplexer 52 and supplied to the adder 53.

At the beginning of the working cycle the counter 61 will have a count of i=0 and accordingly the decoder 62 will supply the value m=1. The input multiplexer 52 transfers the code group which is supplied to its input 1 to its output number 0. The sum formed in the adder 53 as well as the mean value formed in the divider 54 correspond to the numerical value of this single code group. Since this numerical value is as a rule smaller than the maximum value stored in the memory of the minimum value filter 55, it will be supplied at the output 55b of the minimum value filter 55 as the value II For each value m supplied by the decoder 62 the subcounter 63 will count m count pulses from the count 0 to the count (m-1). It thereby controls the (m-1)) steps of the linear interpolation in the interpolator 56. Since in the initial phase here considered m=1, in the subcounter 63 there will be no counting and accordingly no interpolation in the interpolator 56. The value II is transferred from the first output of the interpolator 56 to the input number 0 of the output multiplexer 57. By the same token the value II is stored in the memory 43 of the minimum value filter 55.

The output multiplexer 57 has a function which is the reverse of the function of the input multiplexer 52: it is so controlled by the signal, coming from the decoder 62, with the numerical value m that it transfers the code groups supplied to the inputs numbers 0 through (m-1) of its input group 57a to the outputs numbers m through (2m-1) of its output group 57b. Since the decoder 62 delivers the value m=1 in the initial phase being considered, the code group supplied to the input number 0 of the input group 57a will be delivered at the output number 1 of the output group 57b and fed, via the input connected therewith, to the output memory 58. This code group constitutes the first support point and therefore the initial border value of the first range 1 of the floating threshold profile to be formed; it is stored in the output memory 58 in the memory position corresponding to the first sampling time point of the measurement cycle.

The next phase of the working cycle commences when the counter 61 assumes the count i=1 so that the decoder 62 supplies the value m=2. The input multiplexer 52 supplies the code groups which are supplied to the inputs numbers 2 and 3 of the input group 52a, at the outputs numbers 0 and 1 of the output group 52b to the adder 53, which forms the sum of the numerical values of these two code groups. This sum is divided in the divider 54 by the value m=2. The mean value so obtained is supplied by the minimum value filter 55 at the output 55b as the value II, if it is smaller than the value stored in the preceding phase, which is simultaneously supplied as the value I at the output 55c; otherwise the stored value appears at both outputs 55b and 55c as the value II and as the value I. The two values I and II constitute the border values of the range.

Since the subcounter 63 counts from 0 through 1 for the value m=2, there is one interpolation step in the interpolator 56, in which step by linear interpolation an intermediate value between the values I and II is formed. The code groups representing the intermediate value and the value II are supplied at the two outputs of the interpolator 56 which are connected with the inputs numbers 0 and 1 of the input group 57a of the output multiplexer 57. The output multiplexer supplies these code groups at the outputs numbers 2 and 3 of the output group 57b to the corresponding inputs of the output memory 58; they are stored in the output memory 58 in the memory positions corresponding to the second and, respectively, the third sampling point in time in the measurement cycle.

These operations are repeated from phase to phase for the consecutively following values of the count i of the counter 61 with increasing distances of the support points and a corresponding increase in the number of interpolations between the support points. The following table shows the inputs and outputs of the multiplexers 52 and 57 which are used as well as the number of interpolations which are performed for the formation of the values of the floating threshold profile for the different values of i:

| i | 0 | 1 | 2 | 3 | 4 | i |
|---|---|---|---|---|---|---|
| m | 1 | 2 | 4 | 8 | 16 | $2^i$ |
| Inputs 52a | 1 | 2,3 | 4...7 | 8...15 | 16...31 | m...(2m − 1) |
| Outputs 52b | 0 | 0,1 | 0...3 | 0...7 | 0...15 | 0...(m − 1) |
| Interpolations | 0 | 1 | 3 | 7 | 15 | (m − 1) |
| Inputs 57a | 0 | 0,1 | 0...3 | 0...7 | 0...15 | 0...(m − 1) |
| Outputs 57b | 1 | 2,3 | 4...7 | 8...15 | 16...31 | m...(2m − 1) |

After q phases all n code groups of the echo profile present in the input memory 51 will have been processed and in the output memory 58 there are the n code groups of the total floating threshold profile G, which may be then combined in the above mentioned manner in the combinatorial circuit 29 with the stationary threshold profile F for the formation of the threshold profile H to be supplied to the evaluation circuit 25.

In the case of the embodiment of FIG. 8, too, a monotonously descending floating threshold profile is obtained, since the support values selected by the minimum value filter 55 are constantly decreasing or at the most are of equal size and the linearly interpolated intermediate values correspond to amplitudes which are between the amplitudes of the two support values. This embodiment leads to an even more effective smoothing of the floating threshold profile than the embodiment of FIG. 6. The progressive increase in size of the interpolation ranges renders possible a better adaptation of the floating threshold profile to the particularities of the echo profile. In the initial range, in which the echo profile is subjected to large fluctuations, more particularly owing to post-pulse oscillation of the ultrasonic transducer and owing to close range echoes, the interpolation ranges are small with the result that the floating threshold profile is well able to follow the echo profile despite the larger changes. On the other hand in the later parts of the measurement cycle, which correspond to larger measurement distances, larger interpolation ranges are sufficient for a good adaptation of the floating threshold profile to the course of the echo profile.

For the man skilled in the art it will be clear that the circuit blocks depicted in FIGS. 5, 6 and 7 do not necessarily have to be realized in the form of separate circuits, and may be implemented by the functions of a suitably programmed microcomputer. In this case the echo profile memory 24, the evaluation circuit 25, the stationary threshold profile circuit 26 and the combinatorial circuit 29 of FIG. 1 preferably are also implemented by functions of the same microcomputer.

We claim:

1. A method for distance measurement using the pulse transit time principle, in which in consecutive measurement cycles in each case in a transmission phase a pulse is transmitted and in a receiving phase following the transmission phase the received signal is stored as an echo profile, in which further from at least one stored echo profile the effective echo reflected at the object to be measured is ascertained and the distance of the object is ascertained from the interval in time between the transmission of the pulse and the reception of the effective echo, and in which a stationary threshold profile is formed, which is adapted to the measurement environment for suppression of recurrent interfering signals and is employed in each evaluation of stored echo profiles, said method comprising the steps that from a stored echo profile a floating threshold profile is generated by freeing the echo profile of fluctuations by smoothing it in such a manner that the result is a curve that never increases in value, that of the mutually corresponding values of the floating threshold profile and of the stationary threshold profile the respectively larger value is utilized for forming a resulting threshold profile, and that the resulting threshold profile is employed for each evaluation of stored echo profiles.

2. The method as claimed in claim 1, wherein for smoothing the echo profile the means value of a plurality of consecutive values of the echo profile is formed for each value of the floating threshold profile.

3. The method as claimed in claim 1, wherein from the echo profile spaced support values of the floating threshold profile are determined and in that the values, which are between support values, of the floating threshold profile are derived by linear interpolation.

4. The method as claimed in claim 3, wherein the distances between the support values are progressively increased in the course of time of the measurement cycle.

5. The method as claimed in claim 4, wherein the distances between the support values are progressively increased in the course of time of the measurement cycle by a factor of 2.

6. The method as claimed in claim 4, wherein for the formation of each support value the means value of a plurality of consecutive values of the echo profile is formed.

7. The method as claimed in claim 1, wherein in order to obtain a curve that never increases in value, for each point in time in the measurement cycle a value is utilized if it is smaller than the value employed for the preceding point in time, otherwise the value employed for the preceding point in time is utilized.

8. An arrangement for distance measurement using the pulse transit time principle, comprising a transmitting and receiving device for transmitting a transmission pulse in each measurement cycle and for receiving the echo signals arriving as a result of each transmission pulse, and a signal processing circuit connected with the transmitting and receiving device, said signal processing circuit comprising an echo profile memory in which at least one echo profile is stored, which corresponds to the received signal supplied by the transmitting and receiving device in the course of a measurement cycle, an evaluation circuit which from the echo profile stored in the echo profile memory ascertains the effective echo reflected at the object to be measured and determines the distance of the object from the time interval between the transmission of the pulse and the reception of the effective echo, and a stationary threshold profile circuit in which a stationary threshold profile adapted to the measurement environment is stored, which renders possible the suppression of recurrent interfering signals on each evaluation of a stored echo profile by the evaluation circuit, said arrangement further comprising a floating threshold profile circuit with a device for generating and storing a smoothed and floating threshold profile that never increases in value from a stored each profile, and a combinatorial circuit for combining the floating threshold profile with the stationary threshold profile for forming and storing a resulting threshold profile, which is supplied to the evaluation circuit for the evaluation of the echo profile stored in the each profile memory.

9. The arrangement as claimed in claim 8, wherein the floating threshold profile circuit comprises a minimum value filter, which compares each value, formed for a given point in time in the measurement cycle, of the floating threshold profile with the value formed for the preceding point in time and supplies the smaller value at the output.

10. The arrangement as claimed in claim 9, wherein the minimum value filter comprises a memory for the storage of a value of the floating threshold profile, a comparator and a multiplexer driven by the output signal of the comparator, said comparator and said multiplexer each receiving at a first input a value of the floating threshold profile formed by preceding circuits, and at a second input the value of the floating threshold profile stored in the memory, the output signal of the comparator so controlling the multiplexer in a manner dependent on the result of comparison that the same supplies the smaller of the two values at its output, and the value supplied by the multiplexer being stored in the memory of the minimum value filter.

11. The arrangement as claimed in claim 9, wherein the floating threshold profile circuit comprises an output memory in which the values, supplied by the minimum value filter, of the floating threshold profile are stored in memory positions corresponding to the points in time of the measurement cycle.

12. The arrangement as claimed in claim 9, wherein the floating threshold profile circuit comprises an input memory for the storage of an echo profile, and furthermore a circuit for the formation of the mean value of a plurality of values stored in the input memory, of the echo profile, whose output signal representing the mean value is supplied to the input of the minimum value filter.

13. The arrangement as claimed in claim 12, wherein the circuit for the formation of the mean value comprises an adder, which at its inputs receives a plurality of values of the echo profile End at its output supplies an output signal constituting the sum of these values, and furthermore a divider receiving the output signal of the adder and which divides the sum by the number of values from which the sum is formed.

14. The arrangement as claimed in claim 13, wherein between the input memory and the adder an intermediate memory is arranged to which the values to be summated of the echo profile are transferred from the input memory.

15. The arrangement as claimed in claim 13, wherein between the input memory and the adder a multiplexer is arranged which in each case transfers the output signals of a group of outputs of the input memory to the inputs of the adder.

16. The arrangement as claimed in claim 15, wherein the number of the outputs in each group is determined by a control signal supplied to the multiplexer.

17. The arrangement as claimed in claim 16, further comprising a counter for counting the consecutive phases in which in each case a mean value is formed, and a decoder which from the count of the counter forms a control signal in accordance with a predetermined function, which control signal determines the number of outputs in each group.

18. The arrangement as claimed in claim 9, further comprising an interpolator which receives the value, filtered out by the minimum value filter for a certain point in time, of the floating threshold profile, and the value filtered out for a preceding point in time and produces a certain number of intermediate values by linear interpolation.

19. The arrangement as claimed in claim 18, wherein the number of intermediate values is determined by a control signal supplied to the interpolator.

20. The arrangement as claimed in claim 19, further comprising a counter for counting the consecutive phases in which in each case a mean value is formed, and a decoder which from the count of the counter forms a control signal in accordance with a predetermined function, which control signal determines the number of the intermediate values.

21. The arrangement as claimed in claim 20, wherein between the interpolator and the output memory a multiplexer is arranged which supplies the values from the interpolator to a respective group of parallel inputs of the output memory.

22. The arrangement as claimed in claim 21, wherein the number of the inputs in each group is determined by a control signal supplied to the multiplexer.

23. The arrangement as claimed in claim 22, wherein the number of inputs in each group is determined by the control signal formed by the decoder.

* * * * *